US011175669B2

(12) United States Patent
Nagata et al.

(10) Patent No.: US 11,175,669 B2
(45) Date of Patent: Nov. 16, 2021

(54) INCREASING CONSUMER CONFIDENCE IN AUTONOMOUS VEHICLES

(71) Applicant: Toyota Motor Engineering & Manufacturing North America, Inc., Plano, TX (US)

(72) Inventors: Katsumi Nagata, Foster City, CA (US); Ryan Wiesenberg, Ann Arbor, MI (US); Chris Risberg, Flower Mound, TX (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 194 days.

(21) Appl. No.: 16/529,664

(22) Filed: Aug. 1, 2019

(65) Prior Publication Data
US 2021/0034059 A1 Feb. 4, 2021

(51) Int. Cl.
*G05D 1/02* (2020.01)
*G05D 1/00* (2006.01)
*G01C 21/34* (2006.01)

(52) U.S. Cl.
CPC ....... *G05D 1/0214* (2013.01); *G01C 21/3484* (2013.01); *G05D 1/0088* (2013.01);
(Continued)

(58) Field of Classification Search
None
See application file for complete search history.

(56) References Cited

U.S. PATENT DOCUMENTS

| 9,435,652 B2 | 9/2016 | Ralston et al. |
| 9,682,704 B2 | 6/2017 | Teller et al. |

(Continued)

FOREIGN PATENT DOCUMENTS

| GB | 2524393 | * | 9/2015 | ............ B60W 50/02 |
| WO | WO 2018/135561 | | 9/2016 | |
| WO | WO 2018/028959 | | 2/2018 | |

OTHER PUBLICATIONS

Behringer et al. "RASCAL—An Autonomous Ground Vehicle for Desert Driving in the DARPA Grand Challenge 2005"; Proceedings of the 8th International IEEE Conference on Intelligent Transportation Systems pp. 644-649; Sep. 13-16, 2015.

*Primary Examiner* — Abdhesh K Jha
(74) *Attorney, Agent, or Firm* — Snell & Wilmer LLP (57) ABSTRACT

Methods, systems, and apparatus for a confidence enhancement system. The confidence enhancement system includes a navigation unit configured to obtain navigational map information including a current location of the vehicle. The confidence enhancement system includes a sensor configured to obtain sensor data. The confidence enhancement system includes an electronic control unit. The electronic control unit is coupled to the navigation unit and the sensor. The electronic control unit is configured to determine a confidence score. The confidence score is related to safe operation of the autonomous driving of the vehicle based on the current location of the vehicle and the sensor data. The electronic control unit is configured to determine that the confidence score exceeds a confidence threshold and indicate that autonomous driving is safe at the current location.

18 Claims, 5 Drawing Sheets

(52) U.S. Cl.
CPC ......... *G05D 1/0285* (2013.01); *G05D 1/0278* (2013.01); *G05D 2201/0213* (2013.01)

(56) References Cited

U.S. PATENT DOCUMENTS

| | | |
|---|---|---|
| 9,791,857 B2 | 10/2017 | Ebe |
| 10,126,743 B2 | 11/2018 | Fukumoto |
| 10,156,848 B1 | 12/2018 | Konrady et al. |
| 10,185,327 B1 | 1/2019 | Konrady et al. |
| 10,209,708 B2* | 2/2019 | Hoye .................. B60W 50/10 |
| 10,228,260 B2 | 3/2019 | Swaminathan et al. |
| 10,295,363 B1* | 5/2019 | Konrardy ........ B60W 30/18163 |
| 10,513,274 B1* | 12/2019 | Sung .................... G05D 1/0061 |
| 10,558,224 B1* | 2/2020 | Lin ........................ G08G 1/165 |
| 10,824,144 B1* | 11/2020 | Fields .................. B60W 40/08 |
| 2010/0036599 A1 | 2/2010 | Froeberg et al. |
| 2015/0314780 A1* | 11/2015 | Stenneth ............. G05D 1/0061 701/23 |
| 2016/0132705 A1* | 5/2016 | Kovarik .................. E01F 9/578 340/10.3 |
| 2018/0136655 A1 | 5/2018 | Kim et al. |
| 2018/0266842 A1* | 9/2018 | Di Censo ........... G01C 21/3641 |
| 2019/0094865 A1* | 3/2019 | Fletcher ................ B60W 30/00 |
| 2019/0354111 A1* | 11/2019 | Cheng ................. G05D 1/0011 |
| 2020/0117202 A1* | 4/2020 | Tanimori ............. G05D 1/0214 |
| 2020/0225676 A1* | 7/2020 | Telpaz ................. B60W 40/09 |
| 2020/0284597 A1* | 9/2020 | Chellapilla ............ G06Q 10/02 |

\* cited by examiner

INCREASING CONSUMER CONFIDENCE IN AUTONOMOUS VEHICLES

BACKGROUND

Field

This disclosure relates to increasing consumer confidence in the use of autonomous vehicles.

Description of the Related Art

The rise of autonomous driving has a major impact on both businesses and individuals. As autonomous and/or semi-autonomous vehicles become a more prevalent means of transportation, autonomous and/or semi-autonomous vehicles may replace both commercial and/or personal transportation. For example, the autonomous and/or semi-autonomous vehicles may be used for personal transportation, ride-sharing and/or mass transportation.

Autonomous driving, however, is composed of different levels of autonomy, which may be incorporated into the vehicles. For example, a driver in a vehicle operating at level 0 controls all the functions of the vehicle. In a level 1 vehicle, most functions are still controlled by the driver, but the vehicle provides driver-assistance of a specific function, e.g., steering or accelerating, can be done by the vehicle. In a level 2 vehicle, at least one driver assistance system is automated, like cruise control and/or lane-centering. The driver, however, may take control of the vehicle. In a level 3 vehicle, drivers are still necessary to possibly intervene but are able to completely shift most critical functions to the vehicle, under certain traffic or environmental conditions. In a level 4 vehicle, the vehicle is fully autonomous and designed to perform all critical driving functions and monitor roadway conditions for an entire trip. This level, however, does not cover every driving scenario. Whereas in a level 5 vehicle, the vehicle is fully-autonomous, and the vehicle's performance is equal to that of a human driver in every driving scenario.

These different levels of autonomous driving require different levels of intervention and trust between the driver and the autonomous vehicle driving system. Moreover, different people with different experiences and under different driving scenarios will have different levels of trust and confidence in an autonomous vehicle.

Accordingly, there is a need for a system and a method for developing consumer confidence in an autonomous vehicle by identifying areas safe for autonomous driving.

SUMMARY

In general, one aspect of the subject matter described in this disclosure may be embodied in an autonomous vehicle confidence enhancement system ("confidence enhancement system"). The confidence enhancement system includes a navigation unit configured to obtain navigational map information including a current location of the vehicle. The confidence enhancement system includes a sensor configured to obtain sensor data. The confidence enhancement system includes an electronic control unit. The electronic control unit is coupled to the navigation unit and the sensor. The electronic control unit is configured to determine a confidence score. The confidence score is related to the safe operation of the autonomous driving of the vehicle based on the current location of the vehicle and the sensor data. The electronic control unit is configured to determine that the confidence score exceeds a confidence threshold and indicate that autonomous driving is safe at the current location.

These and other embodiments may optionally include one or more of the following features. The confidence enhancement system may include a communication device. The communication device may be configured to obtain, from one or more surrounding vehicles, vehicle data. The vehicle data may include one or more indications that the one or more surrounding vehicles are driving autonomously. The electronic control unit may be configured to determine the confidence score further based on the vehicle data. The sensor may be a proximity sensor and the sensor data may be a measurement of a number of vehicles surrounding the vehicle.

The confidence enhancement system may include a memory. The memory may be configured to store a user profile that includes an indicator of a level of comfort of a driver with autonomous driving. The electronic control unit may be configured to determine the confidence score further based on the indicator of the level of comfort of the driver. The autonomous driving may have different levels of autonomous driving. The electronic control unit may be configured to increase the level of comfort of the driver with autonomous driving. The electronic control unit may be configured to increase a level of autonomous driving from a first level to a second level when the level of comfort exceeds a threshold. The electronic control unit may be configured to update the level of comfort of the driver with autonomous driving in the user profile and may activate the autonomous driving based on the current level of autonomous driving.

The confidence enhancement system may include a display. The display may be configured to display notifications or alerts. The electronic control unit may be configured to obtain an activation request to activate the autonomous driving and activate the autonomous driving. The confidence enhancement system may include a second sensor. The second sensor may be configured to detect a presence or lack of presence of other occupants within the vehicle. The other occupants may include babies, young children, older adults, etc. who may require additional comfort or have different comfort levels with autonomous driving. For example, the second sensor may be configured to detect the presence or the lack of presence of a child in the vehicle. The electronic control unit may be coupled to the second sensor and may be configured to adjust the confidence threshold based on the presence or the lack of presence of the child or other occupant within the vehicle. To adjust the confidence threshold based on the presence or the lack of presence of the child or the other occupant, the electronic control unit may be configured to increase the confidence threshold when the presence of the child or other occupant is detected and decrease the confidence threshold when the child or other occupant is not detected within the vehicle.

In another aspect, the subject matter may be embodied in a confidence enhancement system for a vehicle. The confidence enhancement system includes a navigation unit. The navigation unit is configured to obtain navigational map information including a current location of the vehicle. The confidence enhancement system includes a communication device. The communication device is configured to obtain vehicle data including one or more indications of one or more surrounding vehicles that are driving autonomously. The confidence enhancement system includes an electronic control unit. The electronic control unit is coupled to the navigation unit and the communication device. The electronic control unit is configured to determine a confidence score related to safe operation of autonomous driving of the vehicle based on the current location of the vehicle and the vehicle data. The electronic control unit is configured to determine that the confidence score exceeds a confidence threshold and indicate that autonomous driving is safe to a driver of the vehicle.

In another aspect, the subject matter may be embodied in a method. The method includes obtaining, by a processor and using a navigation unit, navigational map information including a current location of the vehicle. The method includes obtaining, by the processor and using a sensor, sensor data. The method includes determining, by the processor, a confidence score related to safe operation of autonomous driving of the vehicle based on the current location of the vehicle and the sensor data. The method includes determining, by the processor, that the confidence score exceeds a confidence threshold. The method includes displaying, by the processor and on a display, an indication that autonomous driving is safe at the current location.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for increasing customer confidence in autonomous vehicles. Particular embodiments of the subject matter described in this disclosure may be implemented to realize one or more of the following advantages. The confidence enhancement system collects data from various sensors or devices on the vehicle, other vehicles, other devices on traffic infrastructure ("traffic infrastructure devices") and/or other sources to identify and/or determine areas or regions for safe use of autonomous driving. The confidence enhancement system accounts for various parameters associated with the environment, such as the weather, traffic density, roadway conditions, location of the vehicle, current time, and/or other parameters to determine whether an area is safe for the vehicle to operate autonomously. By accounting for these various parameters, the confidence enhancement system may offer a recommendation, suggestion or other indication to the driver to operate the vehicle using the autonomous driving feature. This increases the confidence the driver has in autonomous driving.

Other benefits and advantages include the capability to control and implement different levels of autonomous driving to adapt to different levels of comfort of the driver. By increasing the level of autonomous driving as the driver becomes more comfortable with autonomous driving, the confidence enhancement system is training both the driver and the vehicle to adapt to each other, which maximizes the degree or amount of autonomous driving and minimizes any discomfort to the driver. Moreover, by collecting data and parameters from multiple sources, the confidence enhancement system more precisely identifies or detects safe areas or regions to utilize autonomous driving. By increasing confidence in autonomous driving and maximizing the use of autonomous driving, the confidence enhancement system allows a driver or other occupant of the vehicle to focus on other tasks without concern for their safety.

Figure 1:
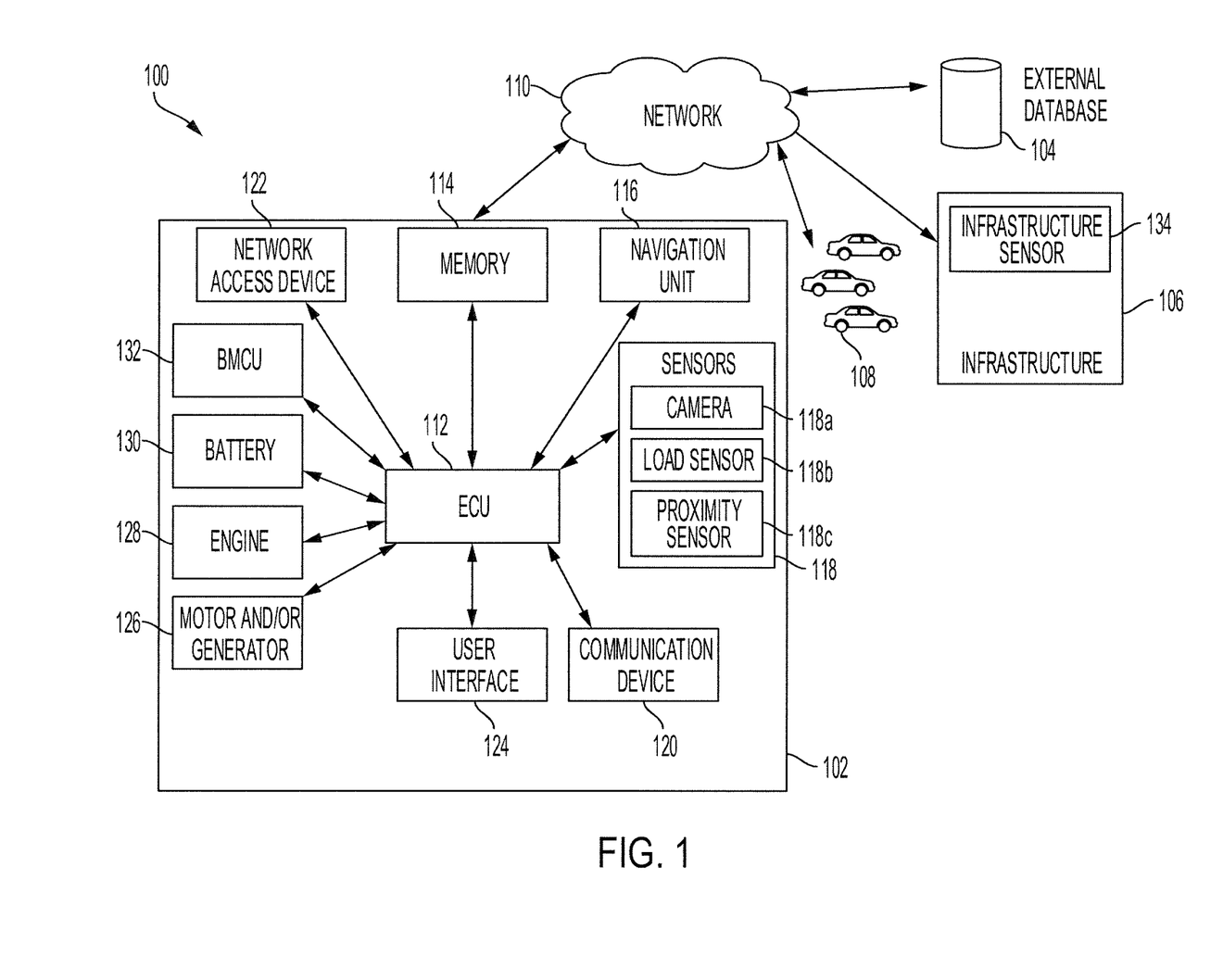
FIG. 1 is a block diagram of an example confidence enhancement system according to an aspect of the invention.

FIG. 1 is a block diagram of a confidence enhancement system 100. The confidence enhancement system 100 may be retro-fitted, coupled to, include or be included within a vehicle 102. The confidence enhancement system 100 may couple, connect to, or include one or more other devices on other entities, such an external database 104, an infrastructure 106 or other vehicle 108. For example, the infrastructure 106 may be a traffic signal, a traffic pole, a bridge or another object near or in proximity to the roadway in which the device may be connected to or included within. In some implementations, the one or more other entities are included within the confidence enhancement system 100 and are part of the confidence enhancement system 100.

The confidence enhancement system 100 may have a network 110 that links the multiple entities to share information. The network 110 may be a local area network (LAN), a wide area network (WAN), a cellular network, the Internet, or combination thereof, that connects, couples and/or otherwise communicates among the multiple entities.

The confidence enhancement system 100 collects, detects and determines various parameters, such as the density of traffic, the location of the vehicle 102, roadway conditions at the location, and/or weather, which may affect or influence a driver's or other occupant's confidence in initializing autonomous driving and/or features on the vehicle 102. The confidence enhancement system 100 identifies or determines areas or regions along the path of the vehicle 102 that are safe to initialize autonomous driving. A safe area is an area or region of a roadway where the driver is comfortable with an increased level of autonomous driving. The comfort level of the driver for the increased level of autonomous driving may be based on parameters that indicate a safe environment for the vehicle 102 to operate without human intervention. When the confidence enhancement system 100 determines that a confidence score, which represents a comfort level of driver and/or values of the parameters that indicate the safe environment, exceeds a confidence threshold, the confidence enhancement system 100 may indicate to the driver to allow for an increased level of autonomous driving and/or increase the level of autonomous driving of the vehicle 102.

The confidence enhancement system 100 may include or be retro-fitted or otherwise coupled with the vehicle 102. A vehicle 102 is a conveyance capable of transporting a person, an object, or a permanently or temporarily affixed apparatus. The vehicle 102 may be a self-propelled wheeled conveyance, such as a car, sports utility vehicle, truck, bus, van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102 may be semi-autonomous or autonomous. The vehicle 102 may different levels of autonomy, for example, levels 0-5 of autonomous driving. That is, the vehicle 102 may be self-maneuvering and navigate without human input and/or with different levels of human input. An autonomous vehicle may have and use one or more sensors and/or a navigation unit to drive autonomously.

The confidence enhancement system 100 includes one or more processors, such as an electronic control unit (ECU) 112 and a memory 114. The confidence enhancement system 100 may include other components, such as a navigation unit 116, one or more vehicle sensors 118, a communication device 120, a network access device 122 and/or a user interface 124. The confidence enhancement system 100 may couple, connect to, and/or include one or more vehicle components such as the motor and/or generator 126, the engine 128, the battery 130, and/or the battery management control unit (BMCU) 134.

The ECU 112 may be implemented as a single ECU or as multiple ECUs. The ECU 112 may be electrically coupled to some or all of the other components within the vehicle 102, such as the motor and/or generator 126, the engine 128, the battery 130, the battery management control unit (BMCU) 132, the memory 114, the network access device 122 and/or one or more vehicle sensors 118. The ECU 112 may include one or more processors or controllers specifically designed for sensing, detecting, measuring and/or otherwise determining or obtaining the various parameters that impact safety and confidence of the driver in the autonomous driving abilities of the vehicle 102. The ECU 112 may calculate or determine a confidence score and confidence threshold and determine whether to alert, suggest or recommend initialization of autonomous driving to the driver. The ECU 112 may be coupled to a memory 114 and execute instructions that are stored on the memory 114.

The memory 114 may be coupled to the ECU 112 and store instructions that the ECU 112 executes. The memory 114 may include one or more of a Random Access Memory (RAM) or other volatile or non-volatile memory. The memory 114 may be a non-transitory memory or a data storage device, such as a hard disk drive, a solid-state disk drive, a hybrid disk drive, or other appropriate data storage, and may further store machine-readable instructions, which may be loaded and executed by the ECU 112.

The confidence enhancement system 100 may include a user interface 124. The confidence enhancement system 100 may display one or more notifications on the user interface 124. The one or more notifications on the user interface 124 may notify or suggest to the driver of the vehicle 102 when to initialize/disengage autonomous driving. The one or more notifications may alert the driver of the vehicle 102 to the level of autonomous driving and/or alert the driver when the level of autonomous driving changes. The user interface 124 may include an input/output device that receives user input, such as a user interface element, a button, a dial, a microphone, a keyboard, or a touch screen, and/or provides output, such as a display, a speaker, an audio and/or visual indicator, or a refreshable braille display. The user interface 124 may receive user input that may include configuration settings for one or more confidence thresholds, for example.

The confidence enhancement system 100 may include a network access device 122. The network access device 122 may include a communication port or channel, such as one or more of a Wi-Fi unit, a Bluetooth® unit, a radio frequency identification (RFID) tag or reader, Dedicated Short-Range Communications (DSRC) or a cellular network unit for accessing a cellular network (such as 3G, 4G or 5G). The network access device 122 may transmit data to and receive data from other entities, such as the infrastructure 106, the external database 104 and/or other vehicles 108. For example, the vehicle 102 may communicate with the other vehicle 108 via the network 110.

The confidence enhancement system 100 may include a communication device 120. The communication device 120 may include vehicle-to-infrastructure (V2I) communication that communicates with a device connected to a roadway or traffic infrastructure (hereinafter, "infrastructure") 106. The communication device 130a-b may include vehicle-to-vehicle (V2V) communication that communicates with another vehicle 108 that is in proximity to the vehicle 102. The communication device 120 communicates V2I and/or V2V to obtain the different parameters that may indicate the safety of using autonomous driving at or near the location of the vehicle 102, for example.

The confidence enhancement system 100 may include a navigation unit 116 and/or one or more vehicle sensors 118. The navigation unit 116 may be integral to the vehicle 102 or a separate unit coupled to the vehicle 102, such as a personal device with navigation capabilities. When the navigation unit 116 is separate from the vehicle 102, the navigation unit 116 may communicate with the vehicle 102 via the network access device 122. In some implementations, the vehicle 102 may include a Global Positioning System (GPS) unit (not shown) for detecting location data and date/time information instead of the navigation unit 116. In that regard, the ECU 112 may perform the functions of the navigation unit 116 based on data received from the GPS unit. At least one of the navigation unit 116 or the ECU 112 may predict or propose a route set that includes a starting location and a destination location. The navigation unit 116 or the ECU 112 may perform navigation functions. Navigation functions may include, for example, route and route set prediction, providing navigation instructions, and receiving user input such as verification of predicted routes and route sets or destinations.

The navigation unit 116 may provide and obtain navigational map information. The navigational map information may include a current location, a starting location, a destination location and/or a route between the starting location or current location and the destination location of the vehicle 102 and may include a memory (not shown) for storing route data. The navigation unit 116 may receive data from other sensors capable of detecting data corresponding to location information. For example, the other sensors may include a gyroscope or an accelerometer.

The navigational map information may also include roadway information. The roadway information may indicate characteristics or conditions of the roadway, such as a road that winds or swerves, a number or location of road hazards including debris or potholes and/or a level of inclination of the roadway. The roadway information may indicate other characteristics of the roadway, such as whether the road is a dirt road, a highway, residential road or other features of the surface, which may affect the drivability of the roadway. The navigational map information may include traffic information, such as the density of traffic in proximity or within a threshold distance of the vehicle 102 along the route and/or areas of road construction.

The one or more vehicle sensors 118 may include one or more cameras 118a, a load sensor 118b and/or a proximity sensor 118c. The one or more cameras 118a may be internal and/or external to vehicle 102 and may capture image data within the vehicle 102 or surrounding the vehicle 102, respectively. The ECU 112 may analyze internal image data within the vehicle 102 to determine the type of occupants within the vehicle 102 and/or identify the driver, for example. In another example, the ECU 112 may analyze external image data surrounding the vehicle 102 to determine the density of the surrounding vehicles or objects within a threshold distance of the vehicle 102. The ECU 112 may also detect the current external environment of the vehicle 102 such as road conditions, objects on the road, weather, etc. and upload the information via the network 110.

The load sensor 118b may be positioned on one or more of the passenger seats within the vehicle 102 and may measure the weight of a load placed on the seat. If the load is less than a threshold amount, this may indicate that a child is sitting on the seat and a passenger within the vehicle 102. The proximity sensor 118c may determine or detect one or more surrounding objects, such as a surrounding vehicle, that is within a threshold distance of the vehicle 102 to determine a traffic density and/or the position of the one or more surrounding objects. The one or more vehicle sensors 118 may include other sensors, such as a road condition sensor that may detect the road inclination or road obstacle. The one or more vehicle sensors 118 may use various technologies, such as infrared, radar, LIDAR, millimeter wave, or a camera to capture data to determine objects in the environment. The ECU 112 may combine multiple data from different sensors to identify the safe driving using Artificial Intelligence (AI).

The confidence enhancement system 100 may couple, connect to, and/or include one or more vehicle components. The one or more vehicle components may include a motor and/or generator 126. The motor and/or generator 126 may convert electrical energy into mechanical power, such as torque, and may convert mechanical power into electrical energy. The motor and/or generator 126 may be coupled to the battery 130. The motor and/or generator 126 may convert the energy from the battery 130 into mechanical power, and may provide energy back to the battery 130, for example, via regenerative braking. In some implementations, the vehicle 102 may include one or more additional power generation devices such as the engine 128 or a fuel cell stack (not shown). The engine 128 combusts fuel to provide power instead of and/or in addition to the power supplied by the motor and/or generator 126. The ECU 112 may couple or connected to other ECUs that would steer, accelerate, brake in the vehicle 102 to drive autonomously.

The battery 130 may be coupled to the motor and/or generator 126 and may provide electrical energy to and receive electrical energy from the motor and/or generator 126. The battery 130 may include one or more rechargeable batteries.

The BMCU 132 may be coupled to the battery 130 and may control and manage the charging and discharging of the battery 130. The BMCU 132, for example, may measure, using battery sensors, parameters used to determine the state of charge (SOC) of the battery 130. The BMCU 132 may control the battery 130 to maintain a reserve power explicitly for providing a sudden burst of electrical energy to be converted into power for the transmission to drive or move the multiple wheels of the vehicle 102.

The confidence enhancement system 100 may include or be coupled to the external database 104. A database is any collection of pieces of information that is organized for search and retrieval, such as by a computer, and the database may be organized in tables, schemas, queries, reports, or any other data structures. A database may use any number of database management systems. The external database 104 may include a third-party server or website that stores or provides information. The information may include real-time information, periodically updated information, or user-inputted information. A server may be a computer in a network that is used to provide services, such as accessing files or sharing peripherals, to other computers in the network.

The external database 104 may be a transportation database that tracks traffic information including traffic direction and/or speed, traffic density and location of vehicles. The traffic information may also include areas or regions of road constructions. The transportation database may also include roadway information. The roadway information may include locations of various road features, such as a windy road, a dirt road, a grade or level of inclination of a roadway and other road features.

The external database 104 may store and/or provide weather information including the temperature, weather, road conditions, amount of precipitation and/or other weather factors that may affect the drivability of the surface of a roadway. For example, when the weather is cold and there is precipitation, the confidence enhancement system 100 may lower the confidence score and/or increase a confidence threshold because a driver would be less confident in allow autonomous driving of the vehicle 102. Whereas, when the weather is sunny and dry, the confidence enhancement system 100 may increase the confidence score and/or increase the confidence threshold because the driver would be more confidence in the abilities of an autonomous vehicle.

The confidence enhancement system 100 may include or be coupled to the infrastructure 106. The infrastructure 106 may be a traffic infrastructure, such as a traffic signal, a traffic pole or other traffic infrastructure or a roadway infrastructure, such as an overpass or an overhead tunnel with a device. The infrastructure 106 may have one or more infrastructure sensors 134 positioned on the infrastructure 106. The one or more infrastructure sensors 134 may detect, measure or otherwise conditions on the roadway including the traffic information and/or the roadway information. The one or more infrastructure sensors 138 may provide the traffic information and/or the roadway information to the vehicle 102 for use in determining and/or calculating a confidence score to implement autonomous driving.

The confidence enhancement system 100 may include or be coupled to one or more other vehicle 108. The confidence enhancement system 100 may use the communication device 120 to communicate with other vehicle 108 to obtain vehicle data including indicates of whether the one or more other vehicles are driving autonomously. The vehicle data may include other sensor data obtained from the one or more other vehicles 108, such as traffic density, weather information and/or road information.

Figure 2:
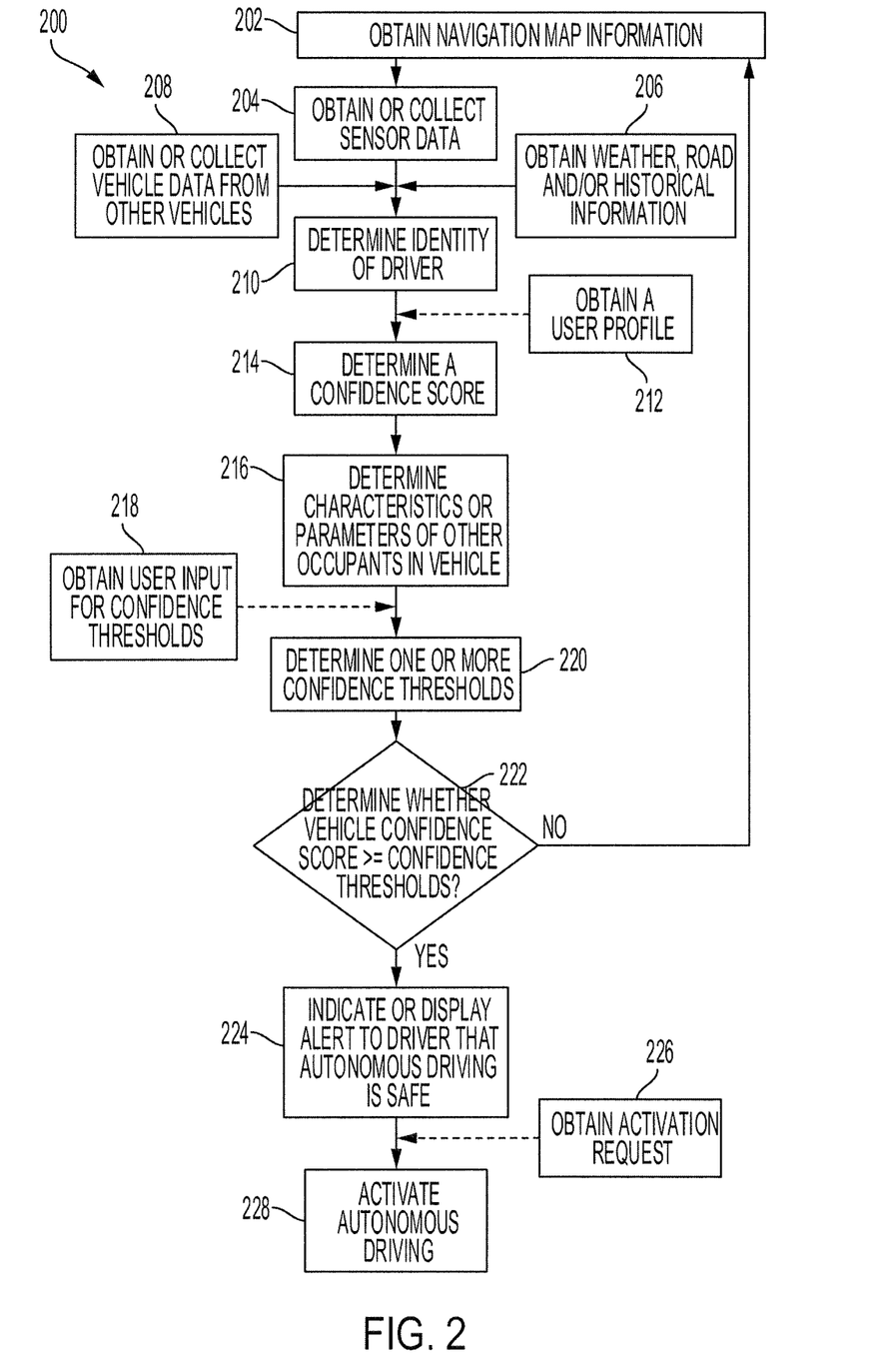
FIG. 2 is a flow diagram of an example process for alerting the driver of the vehicle of a safe area or region to use autonomous driving using the confidence enhancement system of FIG. 1 according to an aspect of the invention.

FIG. 2 is a flow diagram of a process 200 for alerting the driver of the vehicle of a safe area or region to use autonomous driving. One or more computers or one or more data processing apparatuses, for example, the ECU 112 of the confidence enhancement system 100 of FIG. 1, appropriately programmed, may implement the process 200.

The confidence enhancement system 100 obtains navigational map information (202). The confidence enhancement system 100 may use the navigation unit 116 to obtain the navigational map information. The navigational map information may include a current location of the vehicle 102, a destination location, a route between the current location and the destination location and/or other information including traffic information along the route. The traffic information may include areas or location of road construction, the density or location of surrounding vehicles within a threshold distance of the vehicle 102 and/or the location of other obstacles, hazards or objects that increase the complexity of traversing the route for the vehicle 102. This collection of information may be used in assessing the complexity of performing autonomous driving, which may affect the level of comfort of the driver to allow for autonomous driving.

The confidence enhancement system 100 obtains or collects sensor data (204). The confidence enhancement system 100 may use one or more infrastructure sensors 134 and/or one or more sensors 118 including a camera 118a, a load sensor 118b and/or a proximity sensor 118c to detect, collect and/or obtain the sensor data. For example, the confidence enhancement system 100 may use the camera 118a to capture internal and/or external image data. The confidence enhancement system 100 may use the internal image data to identify a driver or an occupant, such as a child, and/or determine the number of occupants in the vehicle 102 and/or use the external image data to determine a number of vehicles in proximity to the vehicle 102 and/or road conditions, such as presence or lack of presence of guard rails, or hazards, such as a pothole or debris, surrounding the vehicle 102. In another example, the confidence enhancement system 100 may use the load sensor 118b, which may be positioned within or on a seat within the vehicle 102 to identify that a child is present within the vehicle 102. In another example, the confidence enhancement system 100 may use a proximity sensor 118c to determine the number and relative distance of surrounding vehicles. Other sensor data may include the level of gradation of the roadway, which may be obtained from a road inclination sensor.

The confidence enhancement system 100 may obtain weather information, road information and/or historical information to use to determine the confidence score and/or the confidence threshold (206). The confidence enhancement system 100 may provide the location of the vehicle to an external database 104, such as a weather database, transportation database and/or other database, and in response, obtain the weather information, road information and/or historical information, respectively.

The weather information may include the type or amount of precipitation, wind or other weather condition in the area or location of the vehicle 102. The roadway information may include roadway conditions, such as ice or other precipitation on the road, the type of road or other conditions that affect the traction between the vehicle 102 and the roadway, construction on a roadway, the type of road, such as whether the road is windy or straight or made of dirt or pavement, the inclination of the roadway and/or other road conditions at the location of the vehicle 102. The historical information may include an indication of a number of times that the driver of the vehicle 102 and/or drivers of other vehicles have turned on or off the autonomous driving at or near the location of the vehicle 102. The historical information may also include pass traffic accident information for the location. In some implementations, the weather information, road information and/or historical information may have been downloaded or stored in the memory 114 where the ECU 112 may have local access to the information.

The confidence enhancement system 100 may obtain or collect vehicle data from other vehicles (208). The vehicle data may include an indication that indicates whether a surrounding vehicle that is within a threshold distance of the vehicle 102 is operating in an autonomous mode. Moreover, the vehicle data may indicate the level of autonomy that the surrounding vehicle is operating in. The confidence enhancement system 100 may use the communication device 120 to communicate V2V with the other vehicles 108. Other vehicle data that may be shared include sensor data from the other vehicles 108. The vehicle data may be collected and used to determine the confidence score and/or the confidence threshold.

When other vehicles are driving autonomously within an area surrounding the location of the vehicle 102, this may signal that the area is safe for autonomous driving. Thus, as the number of vehicles operating autonomous increases within the area, the confidence enhancement system 100 may increase the confidence score to indicate that the area is safe for autonomous driving. Whereas, when very few vehicles are operating autonomously within an area, this may signal that the area is not safe for autonomous driving. Thus, the confidence enhancement system 100 may decrease the confidence score.

The confidence enhancement system 100 may determine the identity of the driver (210). The confidence enhancement system 100 may analyze the image data captured by the camera 116a and/or user input, e.g., the insertion of a personal key fob or personal identification, via the user interface 124 to identify the driver. This allows the confidence enhancement system to tailor the autonomous driving experience to the specific driver that is driving the vehicle 102. Once the image data is captured, the confidence enhancement system 100 may perform facial recognition or other physical recognition of the driver in the image data.

Once the confidence enhancement system 100 identifies the driver of the vehicle 102, the confidence enhancement system 100 may obtain a user profile associated with the driver from the vehicle 102 (212). The user profile may include a history of locations and/or road conditions of where the driver may have initiated and/or used autonomous driving, a level of comfort of the driver using autonomous driving, which may represent the frequency of use of autonomous driving, and/or the levels of autonomous driving, e.g., levels 0-5 of autonomous driving, that the driver is comfortable with, and other parameters related to the use and comfort of autonomous driving of the vehicle 102.

The confidence enhancement system 100 determines a confidence score (214). The confidence score represents a level of comfort of the driver with autonomous driving. The confidence score may correspond with a level of safety in the area, region or location of the vehicle 102 to operate the vehicle 102 autonomously, which may directly correlate with the complexity of the surrounding environment of the vehicle 102. For example, as the environment has more and difficult complex parameters, such as weather, road conditions and/or more surrounding vehicles, the environment is less safe for autonomous driving and the driver will likely prefer more control over the vehicle 102, and thus, a lower confidence score of autonomous driving is associated with complex environments. Whereas, when there are less parameters or less difficult parameters, the environment is safer for autonomous driving and the driver is more likely to allow for autonomous driving, and thus, a higher confidence score of autonomous driving is associated with less complex environments.

The confidence enhancement system 100 may account for the complexity by determining the confidence score based on the various parameters. The various parameters may include the navigational map information including the location of the vehicle 102, the vehicle data from the other vehicles, the traffic density or number of vehicles surrounding the vehicle, the weather information, road information and/or historical information.

For example, if the indication in the vehicle data indicates that a percentage of the surrounding vehicles are currently using autonomous driving in the area, such as more than 50% of the vehicles which are capable of autonomous driving, then, the confidence enhancement system 100 may increase the confidence score because other vehicles have determined that the area is safe for autonomous driving. In another example, if the weather information indicates that there is no precipitation or little precipitation, then, the confidence enhancement system 100 may increase the confidence score because there are less weather-related issues. Similarly, if there are less road hazards, such as potholes or debris, or the road is a straightaway based on the road information or the driver has historically used autonomous driving within the area of the location based on the driver's frequency of activation within the historical information, the confidence enhancement system 100 may increase the confidence score. The opposite may also be true. When there is more road hazards, weather hazards, or less use of the autonomous driving feature in the area by other vehicles or historically by the driver, the confidence enhancement system 100 may decrease the confidence score because there is less likelihood that the driver believes that the area is safe for autonomous driving.

The confidence enhancement system 100 may also base the confidence score on the level of comfort of the driver with autonomous driving. The confidence enhancement system 100 may extract the level of comfort of the driver from the user profile and use the level of comfort of the driver as a default or baseline for the confidence score. When a driver is more comfortable with autonomous driving, the driver's confidence or confidence score in autonomous driving will be higher than when the driver is less comfortable with autonomous driving. The parameters may be weighted, prioritized or otherwise used in calculating or determining the confidence score. The weighting, prioritization and/or calculation may be dynamic and executed in real-time for the particular location and/or situation.

The confidence enhancement system 100 may determine characteristics or parameters of other occupants within the vehicle 102 (216). The characteristics or parameters of the other occupants within the vehicle 102 may include the number of occupants, the level of comfort of each occupant with autonomous driving and/or physical characteristics, including the height, weight and/or overall size of the occupant within the vehicle 102. For example, the confidence enhancement system 100 may use a load sensor 118b to measure the weight of an object, such as a person, on one of the passenger seats. If the weight of the object is less than a threshold amount, this may indicate that a child is in one of the passenger seats of the vehicle 102. And thus, the driver may be more cautious to initiate autonomous driving when a child is in the vehicle 102 while driving and/or because there is an additional occupant within the vehicle 102. The caution may be represented in a confidence threshold that the confidence score would need to exceed to recommend autonomous driving to the driver and/or a lower confidence score. The confidence enhancement system 100 may identify the child or other occupant using the one or more sensors 118 including the camera. For example, the confidence enhancement system 100 may recognize that the object is a child from the image data to identify the presence or lack of presence of the child within the vehicle 102.

The confidence enhancement system 100 may obtain or receive user input that indicates one or more confidence thresholds (218). The confidence enhancement system 100 may obtain the user input via the user interface 124. The user input may include one or more configuration settings or values that represent one or more levels of comfort that the driver must have for the driver to consider operating the vehicle 102 autonomously using a particular level of autonomous driver and/or one or more levels of complexity of the environment where the vehicle 102 may safely operate autonomously at the particular level. The one or more configurations settings or values set the confidence threshold for different levels of autonomous driving, which may be adjusted by other characteristics or parameters of other occupants within the vehicle 102.

The confidence enhancement system 100 determines one or more confidence thresholds (220). The confidence enhancement system 100 may have a single confidence threshold to represent when to activate the autonomous driving and/or have multiple confidence thresholds to represent when to activate different levels of autonomous driving. For example, the confidence enhancement system 100 may use multiple confidence thresholds to implement different levels of autonomous driving. When the confidence score exceeds a first confidence threshold, the confidence enhancement system 100 may recommend initializing level 3 autonomous driving (or partial autonomous driving), whereas, when the confidence score exceeds a second confidence threshold greater than the first confidence threshold, the confidence enhancement system 100 may recommend initializing level 4 autonomous driving (or full autonomous driving) for most situations.

The one or more confidence thresholds may be based on the user input and/or the characteristics or parameters of other occupants in the vehicle 102. The confidence enhancement system 100 initially sets the one or more confidence thresholds to the corresponding configuration setting or value indicated in the user input. Then, the confidence enhancement system 100 may adjust the one or more confidence thresholds based on the characteristics or parameters of the other occupants, such as the presence or lack of presence of a child. In some implementations, the one or more confidence thresholds are a default value and/or based on the characteristics or parameters of the other occupants.

For example, when a child is in the vehicle 102, a driver may be more cautious to implement autonomous driving, and thus, the driver may require a safer area or region before operating the vehicle 102 autonomously. The confidence enhancement system 100 adjusts to the presence of the child by setting a higher confidence threshold for autonomous driving. Whereas, when the child is not present, the confidence enhancement system 100 may remain on the initial or default value for the confidence threshold because caution is unnecessary.

The confidence enhancement system 100 determines whether the confidence score exceeds the one or more confidence thresholds (222). If the value of the confidence score does not exceed, e.g., is less than, the one or more confidence thresholds, the confidence enhancement system 100 continues to monitor the location of the vehicle 102 and the surrounding environment of the vehicle 102. When the value of the confidence score does not exceed the one or more confidence thresholds, this may indicate that the area or region surrounding the vehicle 102 is not safe for autonomous driving. If the value of the confidence score does exceed, e.g., is greater than or equal to, the one or more confidence thresholds, the confidence enhancement system 100 may inform the driver that autonomous driving is safe. When the value of the confidence score exceeds the one or more confidence thresholds, this may indicate that the area or region surrounding the vehicle is safe for autonomous driving.

When the value of the confidence score exceeds a low confidence threshold, the confidence enhancement system 100 may determine that a low level of autonomous driving is safe, such as level 2 of autonomous driving. As the confidence score increases and exceeds a medium confidence threshold, the confidence enhancement system 100 may determine that a medium level of autonomous driving is safe, such as level 3 of autonomous driving (or partial autonomous driving). When the confidence score increases and exceeds a high confidence threshold, the confidence enhancement system 100 may determine that a high level or complete autonomous driving is safe, such as levels 4-5 of autonomous driving (or full autonomous driving).

Figure 5A:
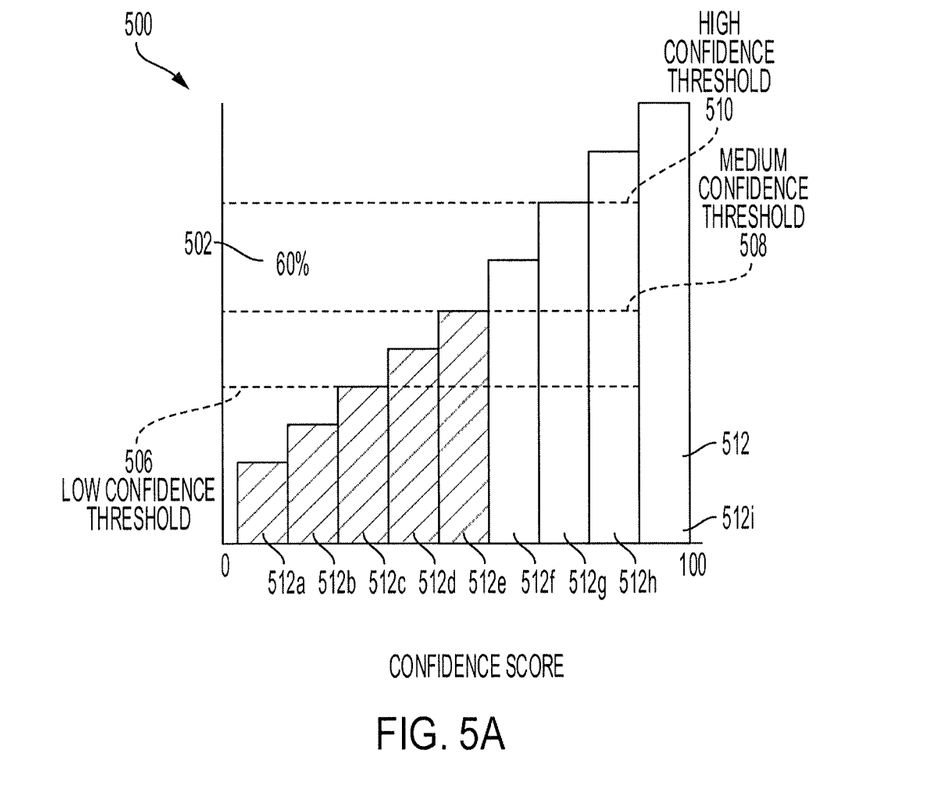
FIG. 5A shows an example graphical user interface of the confidence enhancement system of FIG. 1, which displays the confidence score and one or more confidence thresholds according to an aspect of the invention.

The confidence enhancement system 100 indicates, displays or otherwise alerts the driver that autonomous driving is safe when the confidence score exceeds the one or more confidence thresholds (224). The confidence enhancement system 100 may use a visual or audio indicator to alert the driver that autonomous driving is safe. In some implementations, the confidence enhancement system 100 may provide a percentage, ratio, value or other graphical representation of the confidence score and the one or more confidence thresholds, as shown in FIG. 5A for example. The graphical representation may have multiple light indicators, which may light or otherwise show a progression of the confidence score and the one or more confidence thresholds. When the confidence enhancement system 100 alerts the driver that autonomous driving is safe, the alert or notification may recommend a particular level of autonomous driving, such as levels 0-5. Moreover, the alert or notification may include additional information, such as a confirmation request to activate the autonomous driving.

The confidence enhancement system 100 may receive user input including an activation request to activate the autonomous driving (226). The activation request may be in response to the confirmation request and confirm that autonomous driving should be activated. The confidence enhancement system 100 may activate the autonomous driving (228). This may include activating one or more sensors 118, activating the navigation unit 116 and/or control operation of the vehicle 102 based on the level of autonomous driving. The activation of the autonomous driving may be in response to the activation request or be done automatically upon determining that the area is safe for autonomous operation.

Figure 3:
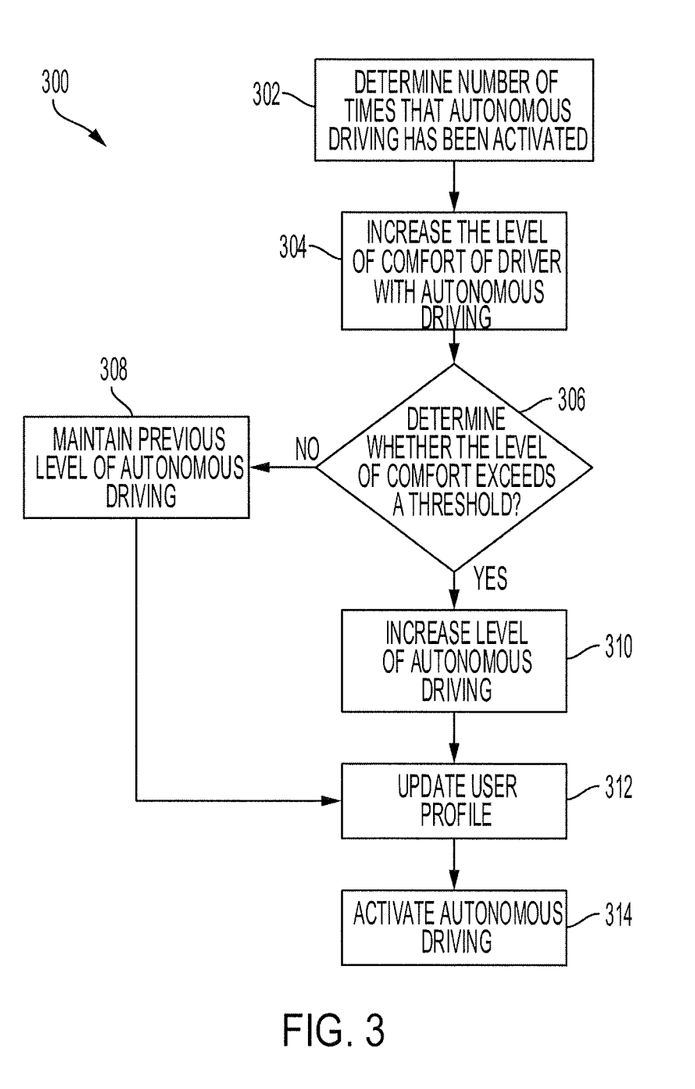
FIG. 3 is a flow diagram of an example process for adjusting the level of autonomous driving while maintaining driver comfort using the confidence enhancement system of FIG. 1 according to an aspect of the invention.

FIG. 3 is a flow diagram of a process 300 for training the driver to be more comfortable with an increased amount of autonomous driving. One or more computers or one or more data processing apparatuses, for example, the ECU 112 of the confidence enhancement system 100 of FIG. 1, appropriately programmed, may implement the process 300.

Once the confidence enhancement system 100 determines that the autonomous driving should be activated, the confidence enhancement system 100 may determine a number of times that autonomous driving has been activated at the level of comfort that the driver has with autonomous driving while detecting the physical and emotional expression of the driver (302). The physical and emotional expression of the driver may assist in determining the level of comfort of the driver. The confidence enhancement system 100 may obtain or have previously obtained the level of comfort and/or an indicator that indicates the number of times that the autonomous driving was activated at the level of comfort from the user profile of the driver and increment the number of times to account for the current activation request.

The confidence enhancement system 100 may increase the level of comfort of the driver when the number of times that the autonomous driving has been activated at the current level of comfort exceeds a threshold (304). When the number of times that the autonomous driving has been activated exceeds the threshold, this may indicate that the driver has become more comfortable or accustomed to the current level of autonomous driving, and so, the confidence enhancement system 100 adapts to the driver's level of comfort and may increase the level of comfort of the driver to reflect the new comfort of the driver. This indicator may be reset when the level of comfort of the driver changes.

For example, if the driver is currently a level 1 out of 10 with respect to comfort with autonomous driving but has activated the autonomous driving after the three previous times the confidence enhancement system 100 indicates that autonomous driving is safe, the confidence enhancement system 100 may increase the driver's level of comfort to 2 out of 10 when the driver activates autonomous driving after the fourth indication that autonomous driving is safe. The confidence enhancement system 100 may require that the number of times that the autonomous driving has been activated occur within consecutive indications that autonomous driving is safe or that the number of times that the autonomous driving has been activated occur in the aggregate.

The confidence enhancement system 100 determines whether the level of comfort exceeds a threshold level, e.g., greater than a particular threshold (306). Each level of comfort of the driver with autonomous driving may be associated with a corresponding level of autonomous driving. As the level of comfort of the driver increases, the confidence enhancement system 100 may increase the level of autonomous driving to train the driver to become more comfortable with increasing levels of autonomous driving. And, as the level of comfort of the driver decreases, the confidence enhancement system 100 may decrease the level of autonomous driving to make the driver more comfortable with the overall driving experience. Thus, the confidence enhancement system 100 simultaneously trains the driver to trust the autonomous driving capability and maintains a comfortable driving experience.

When the confidence enhancement system 100 determines that the level of comfort of the driver does not exceed the threshold, e.g., when the level of comfort is less than or equal to the threshold, the confidence enhancement system 100 may maintain the current level of autonomous driving (308). For example, when the level of comfort of the driver was 4 out of 10 and increases to 5 out of 10 and the threshold to increase to the next level of autonomous driving is 6 out of 10, the confidence enhancement system 100 will maintain the current level of autonomous driving.

When the confidence enhancement system 100 determines that the level of comfort of the driver exceeds the threshold, e.g., when the level of comfort is greater than the threshold), the confidence enhancement system 100 may increase the level of autonomous driving (310). For example, in the above example, when the level of comfort of the driver increases to 6 out of 10, the confidence enhancement system 100 increases the level of autonomous driving, e.g., from level 3 to level 4 on the level 0-5 scale.

Once the confidence enhancement system increases the level of comfort, the confidence enhancement system 100 updates the level of comfort for the driver within the user profile (312). The confidence enhancement system 100 may store the updated user profile in the memory 114 so that the user profile may be used for subsequent trips, areas, regions or other locations to perform autonomous driving. Then, the confidence enhancement system 100 may activate the autonomous driving (314).

Figure 4:
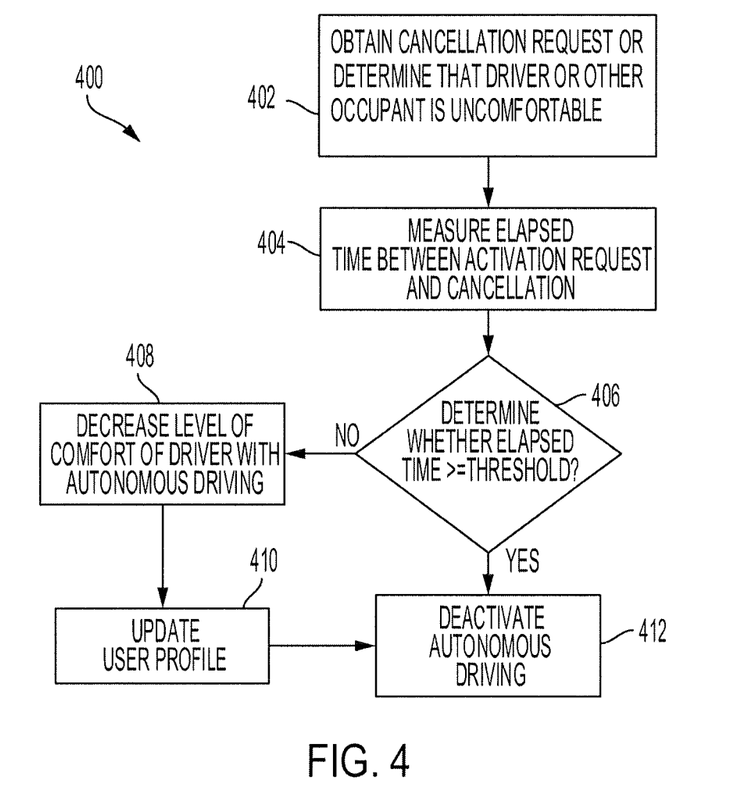
FIG. 4 is a flow diagram of an example process for deactivating autonomous driving of the vehicle using the confidence enhancement system of FIG. 1 according to an aspect of the invention.

FIG. 4 is a flow diagram of a process 400 for deactivating autonomous driving of the vehicle 102. One or more computers or one or more data processing apparatuses, for example, the ECU 112 of the confidence enhancement system 100 of FIG. 1, appropriately programmed, may implement the process 400. When the driver deactivates autonomous driving of the vehicle 102, this may indicate that the driver is uncomfortable with the level of autonomous driving. That is, the driver desires to have more control over the vehicle 102. The ECU 112 may also notify the driver to cancel autonomous driving if it detected the status of the driver and/or other occupants are not suitable or comfortable enough to drive autonomously in the current roadway or environmental condition.

The confidence enhancement system 100 obtains or receives a cancellation request or otherwise determines that the driver and/or other occupants are not comfortable with the autonomous driving (402). The cancellation request is a request to deactivate the autonomous driving. The confidence enhancement system 100 may receive the cancellation request via the user interface 124. For example, the driver may toggle a button, select or deselect a user interface element or otherwise initiate the cancellation request to cancel the autonomous driving. The confidence enhancement system 100 may measure facial expression within the image data to determine whether the driver or other occupant is uncomfortable with the autonomous driving.

The confidence enhancement system 100 measures an amount of elapsed time between the activation of the autonomous driving and obtaining the cancellation request or determining that the driver or other occupant is uncomfortable (404). The amount of elapsed time may indicate whether the driver cancelled the autonomous driving because the driver is uncomfortable with level of autonomous driving or cancelled for other reasons. Thus, if a driver cancels autonomous driving or the confidence enhancement system 100 determines that the driver or other occupant is uncomfortable after a significant amount of elapsed time from when the autonomous driving was activated, the driver is likely cancelling the autonomous driving for other reasons rather than discomfort.

After the confidence enhancement system 100 receives the cancellation request or determines that the driver or occupant is uncomfortable, the confidence enhancement system 100 may determine whether the elapsed time is greater than or equal to a threshold amount (406). The threshold amount may be pre-configured, such as up to approximately 2 minutes after activation, or otherwise determined by a user configuration or setting that may be adjusted via user input.

If the elapsed time is less than the threshold, the confidence enhancement system 100 decreases the level of comfort of the driver with autonomous driving (408). When the confidence enhancement system 100 determines that the elapsed time is less than the threshold amount, the driver likely has turned off or deactivated the autonomous driving because of a lack of comfort. Thus, the confidence enhancement system 100 may decrease the level of comfort of the driver to reflect the discomfort of the driver with the level of autonomous driving. Since the level of comfort of the driver is decreased, the level of autonomous driving that is subsequently performed may be reduced. The confidence enhancement system 100 may update the user profile with the level of comfort and store the user profile in the memory 114 (410) and proceed with deactivating the autonomous driving. Otherwise, if the confidence enhancement system 100 determines that the elapsed time is greater than or equal to the threshold, the confidence enhancement system 100 proceeds with deactivating the autonomous driving. When the confidence enhancement system 100 determines that the elapsed time is greater than or equal to the threshold amount, the driver likely has turned off or deactivated the autonomous driving for reasons other than being uncomfortable. Thus, no adjustment to the level of comfort of the driver would be necessary prior to deactivation.

The confidence enhancement system 100 deactivates the autonomous driving (412). When autonomous driving is deactivated, control of the vehicle 102 returns to a default level of autonomous driving, which may be pre-configured or pre-set. The default level may provide full control of the vehicle 102 to the driver and/or allow some driver-assist features to remain active.

Figure 5B:
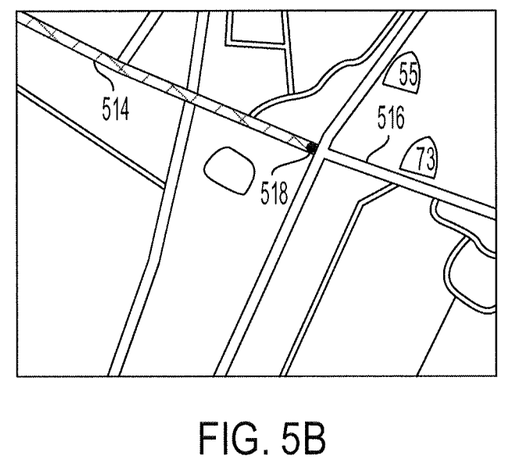
FIG. 5B shows an example graphical user interface of the confidence enhancement system of FIG. 1, which displays an overlay of safe areas for autonomous driving along the route of the vehicle according to an aspect of the invention.

FIG. 5A shows a graphical interface 500, such as a display. The graphical interface 500 may have a light indicator 512 and/or a numerical value representation 502 of the confidence score. The numerical value representation 502 may be illuminated on the graphical interface and show the confidence score as a percentage, ration and/or other numerical value. The light indicator 512 may have multiple levels of lights 512a-i that each correspond to a range for the confidence score. For example, the first level of lights 512a may represent a confidence score of 0%-10%, the second level of lights 512b may represent a confidence score of 10%-20% and so on. Once the confidence enhancement system 100 calculates or determines the confidence score, the confidence enhancement system 100 may illuminate the corresponding levels of lights 512a-i. Moreover, the graphical interface 500 may show the different confidence thresholds 506, 508, 510. The one or more confidence thresholds 506, 508, 510 may show the different threshold for different levels of autonomous driving. For example, when the confidence score exceeds the low confidence threshold 506, the confidence enhancement system 100 may indicate to the driver that operation of levels 0-2 of autonomous driving is safe. As the confidence score increases and exceeds the medium confidence threshold 508, the confidence enhancement system 100 may determine that level 3 of autonomous driving (or partial autonomous driving) is safe. And, when the confidence score increases and exceeds a high confidence threshold, 510 the confidence enhancement system 100 may determine that a high level or complete autonomous driving is safe, such as levels 4-5 of autonomous driving (or full autonomous driving). In some implementations, the confidence enhancement system 100 may display the safe areas or regions 514 for autonomous driving as an overlay on a map that shows the location 516 and route of the vehicle 102, as shown in FIG. 5B, for example.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for a vehicle, comprising:
a navigation unit configured to obtain navigational map information including a current location of the vehicle;
a communication device configured to obtain, from one or more surrounding vehicles, one or more indications that the one or more surrounding vehicles are driving autonomously; and
an electronic control unit coupled to the navigation unit and the communication device and configured to:
determine a confidence score related to safe operation of autonomous driving of the vehicle based on a number of other vehicles surrounding the vehicle that are operating autonomously at or near the current location of the vehicle,
determine that the confidence score exceeds a confidence threshold, and
indicate that autonomous driving is safe at the current location.

2. The system of claim 1, further comprising a proximity sensor that is configured to detect the number of other vehicles surrounding the vehicle.

3. The system of claim 1, further comprising:
a memory configured to store a user profile that includes a value that represents a level of comfort of a driver with autonomous driving;
wherein the electronic control unit is configured to determine the confidence score further based on the value that represents the level of comfort of the driver.

4. The system of claim 3, wherein the autonomous driving has a plurality of different levels of autonomous driving, wherein the electronic control unit is configured to:
increase the value that represents the level of comfort of the driver with autonomous driving;
increase a current level of autonomous driving of the plurality of different levels of autonomous driving from a first level to a second level when the value that represents the level of comfort exceeds a threshold;
update the value that represents the level of comfort of the driver with autonomous driving in the user profile; and
activate the autonomous driving based on the current level of autonomous driving.

5. The system of claim 1, further comprising:
a display configured to provide notifications or alerts;
wherein the electronic control unit is further configured to:
obtain an activation request to activate the autonomous driving, and
activate the autonomous driving.

6. The system of claim 1, further comprising:
a sensor configured to detect a presence or lack of presence of a child or other occupant other than a driver of the vehicle;
wherein the electronic control unit is coupled to the sensor and configured to:
adjust the confidence threshold based on the presence or the lack of presence of the child or the other occupant other than the driver of the vehicle.

7. The system of claim 6, wherein to adjust the confidence threshold based on the presence or the lack of presence of the child or the other occupant other than the driver of the vehicle, the electronic control unit is configured to:
increase the confidence threshold when the presence of the child or the other occupant other than the driver is detected; and
decrease the confidence threshold when the child or the other occupant other than the driver is not detected within the vehicle.

8. A system for a vehicle, comprising:
a navigation unit configured to obtain navigational map information including a current location of the vehicle;
a communication device configured to obtain vehicle data including one or more indications of one or more surrounding vehicles that are driving autonomously; and
an electronic control unit coupled to the navigation unit and the communication device and configured to:
determine a confidence score related to safe operation of autonomous driving of the vehicle based on the current location of the vehicle and the vehicle data,
determine that the confidence score exceeds a confidence threshold,
indicate that autonomous driving is safe to a driver of the vehicle,
increase a value that represents a level of comfort of the driver with autonomous driving,
increase a current level of autonomous driving from a first level to a second level when the level of comfort exceeds a threshold,
update the value that represents the level of comfort of the driver with autonomous driving in a user profile, and
activate the autonomous driving based on the current level of autonomous driving.

9. The system of claim 8, further comprising:
a sensor that is configured to determine a number of surrounding vehicles within a threshold distance from the vehicle;
wherein the electronic control unit is coupled to the sensor and configured to:
determine the confidence score further based on the number of surrounding vehicles.

10. The system of claim 8, further comprising:
a sensor configured to detect a presence or lack of presence of a child within the vehicle;
wherein the electronic control unit is coupled to the sensor and configured to:
adjust the confidence threshold based on the presence or the lack of presence of the child within the vehicle.

11. The system of claim 10, wherein to adjust the confidence threshold based on the presence or the lack of presence of the child within the vehicle, the electronic control unit is configured to:
increase the confidence threshold when the presence of the child is detected within the vehicle; and
decrease the confidence threshold when the child is not detected within the vehicle.

12. The system of claim 8, further comprising:
a memory configured to store the user profile that includes the value that represents the level of comfort of the driver with autonomous driving;
wherein the electronic control unit is configured to determine the confidence score further based on the value that represents the level of comfort of the driver.

13. The system of claim 8, further comprising:
a display configured to provide notifications or alerts;

wherein the electronic control unit is further configured to:
obtain an activation request to activate the autonomous driving.

14. A method, comprising:
obtaining, by a processor and using a navigation unit, navigational map information including a current location of a vehicle;
obtaining, by the processor and using a sensor, sensor data;
determining, by the processor, a confidence score related to safe operation of autonomous driving of the vehicle based on the current location of the vehicle and the sensor data;
determining, by the processor, that the confidence score exceeds a confidence threshold;
displaying, by the processor and on a display, an indication that autonomous driving is safe at the current location;
increasing, by the processor, a value that represents a level of comfort of a driver with autonomous driving;
increasing, by the processor, a current level of autonomous driving from a first level to a second level when the value that represents the level of comfort of the driver exceeds a threshold; and
updating, by the processor, the value that represents the level of comfort of the driver with autonomous driving in a user profile.

15. The method of claim 14, further comprising:
obtaining, by the processor and from one or more surrounding vehicles using a communication device, vehicle data that includes one or more indications that the one or more surrounding vehicles are driving autonomously, wherein determining the confidence score is further based on the vehicle data.

16. The method of claim 14, wherein the sensor is a proximity sensor and the sensor data is a measurement of a number of vehicles surrounding the vehicle.

17. The method of claim 14, further comprising:
obtaining, by the processor, the user profile that includes the value that represents the level of comfort of the driver with autonomous driving, wherein determining the confidence score is further based on the value that represents the level of comfort of the driver.

18. A system for a vehicle, comprising:
a navigation unit configured to obtain navigational map information including a current location of the vehicle;
a sensor configured to obtain sensor data; and
an electronic control unit coupled to the navigation unit and the sensor and configured to:
determine a confidence score related to safe operation of autonomous driving of the vehicle based on the current location of the vehicle and the sensor data,
determine that the confidence score exceeds a confidence threshold,
indicate that autonomous driving is safe at the current location,
increase a value that represents a level of comfort of a driver with autonomous driving,
increase a current level of autonomous driving from a first level to a second level when the value that represents the level of comfort of the driver exceeds a threshold,
update the value that represents the level of comfort of the driver with autonomous driving in a user profile, and
activate the autonomous driving based on the current level of autonomous driving.

* * * * *